United States Patent [19]

Lee et al.

[11] Patent Number: 5,016,241

[45] Date of Patent: May 14, 1991

[54] SMALL DISK ADAPTER WITH STORAGE CASE

[75] Inventors: Noel M. Lee, Daly City; Rodney A. Herman; Thomas J. Crothers, both of Alameda, all of Calif.

[73] Assignee: Monster Cable Products, Inc., San Francisco, Calif.

[21] Appl. No.: 377,535

[22] Filed: Jul. 10, 1989

[51] Int. Cl.⁵ .............................................. G11B 7/26
[52] U.S. Cl. .................................. 369/289; 369/273; 369/291
[58] Field of Search ............... 369/289, 290, 291, 292, 369/273

[56] References Cited

U.S. PATENT DOCUMENTS

| | | | |
|---|---|---|---|
| 3,201,133 | 8/1965 | Matsukata | 369/289 |
| 4,148,491 | 4/1979 | Stark et al. | 369/289 |
| 4,159,827 | 7/1979 | Torrington | 369/291 X |
| 4,239,108 | 12/1980 | Coleman et al. | 369/291 X |
| 4,463,849 | 8/1984 | Prusak et al. | 369/291 X |
| 4,694,448 | 9/1987 | Tamaru et al. | 369/291 |
| 4,837,784 | 5/1989 | Yamamori | 369/291 X |
| 4,881,218 | 11/1989 | Yamamori | 369/289 |
| 4,899,330 | 2/1990 | Einhaus | 369/289 |
| 4,928,271 | 5/1990 | Verhagen | 369/289 X |

FOREIGN PATENT DOCUMENTS 0249986 10/1988 Japan ..................................... 369/292

Primary Examiner—Benjamin R. Fuller
Assistant Examiner—Randy W. Gibson
Attorney, Agent, or Firm—Rosen, Dainow & Jacobs

[57] ABSTRACT

An adapter for use with compact disk recording media for enabling use of a small disk of a first diameter on a mechanism only capable of handling recording media of a diameter larger than the first diameter comprising a first portion for securing the disk, the first portion storing the disk prior to use, a second portion detachably connected to the first portion and having a support surface and a mounting segment on the support surface, the mounting segment being circular and of sufficient diameter to accommodate the disk, in operative position on the mechanism, the support surface being substantially rectangular and having a long diameter larger than the first diameter.

13 Claims, 3 Drawing Sheets

SMALL DISK ADAPTER WITH STORAGE CASE

DESCRIPTION OF THE FIELD

The present invention relates to adapter mechanisms for use with compact disk recording media, particularly to a package which may be employed for both securing and playing a compact disk of one size on a compact disk player normally adapted to play larger diameter disks.

DESCRIPTION OF THE PRIOR ART

The proliferation of compact disk recording media for use in audio reproduction technology is currently widespread. The conventional manner or mode of compact disk mechanisms provide for a typical compact disk diameter of 5 ¼ inches. These disks are relatively expensive to produce and are also relatively large for storage purposes. Thus, the market has recognized and filled the need for smaller compact disks by providing disks of approximately 3 inch diameter. These disks are less expensive to manufacture, utilize less commercial music or dramatic production, thereby reducing effective royalty rates payable thereon, and also, being smaller, are easier to store. The difficulty encountered is that compact disk players currently only recognize 5 ¼ diameter disks. This problem is solved by the provision of a simple adapter mechanism in to which the 3 inch disk may be placed, and which may be utilized to adapt the 5 ¼ inch player for 3 inch disk. The difficulty encountered with this mechanism is that adapter mechanisms are also expensive, require the continuous placement of disks in and out of the adapter mechanism by the user, and thereby necessitate both inconvenience and difficulty in manipulation. In addition, the packaging requirements for the small disks make storage and retrieval in connection with the adapter devices difficult.

BRIEF DESCRIPTION OF THE PRESENT INVENTION

The object of the present invention is to provide a novel and unique package for a compact disk which will both store and adapt a small compact disk to a player which will play only the larger compact disks.

It is another object of the present invention to provide a means for permanently securing a small disk into an adapter thereby eliminating the necessity for constantly changing and removing discs from adapters.

It is another object of the present invention to provide a small compact disk package which will include an adapter mechanism for a small compact disk and which may be employed to play the small compact disk upon a large compact disk player and at the same time permits the compact disk to be stored in a manner which takes advantage of its relatively small size.

The foregoing objects are achieved in accordance with the present invention by means by of an adapter mechanism for use with a compact disk recording media for enabling use of a small disk of a first diameter on a mechanism only capable of handling recording media of a second diameter, with the second diameter being larger than the first diameter, the adapter mechanism including a first portion for storing the disk, the first portion securing the disk prior to use. The adapter mechanism includes a second portion which is detachably connected to first portion and has thereon a support surface including a mounting segment and of sufficient diameter to accommodate the compact disk, with the support surface being substantially rectangular and having a side length equal to the diameter required for the larger diameter compact disk player.

The adapter mechanism may also provide for the mounting segment to be a depressed portion integrally molded with the support surface. The mounting segment may also include an adhesive area substantially surrounding the outer peripheral area for securing the compact disk in position. The adapter mechanism also provides for plurality of breakaway hinges which serve the function of allowing the lower portion of the adapter mechanism to be used as the device facilitating the larger diameter player, and at the same time permitting the use of storage of the compact disk in the first portion by means of a nested configuration.

DESCRIPTION OF THE PREFERRED EMBODIMENT

Figure 1A:
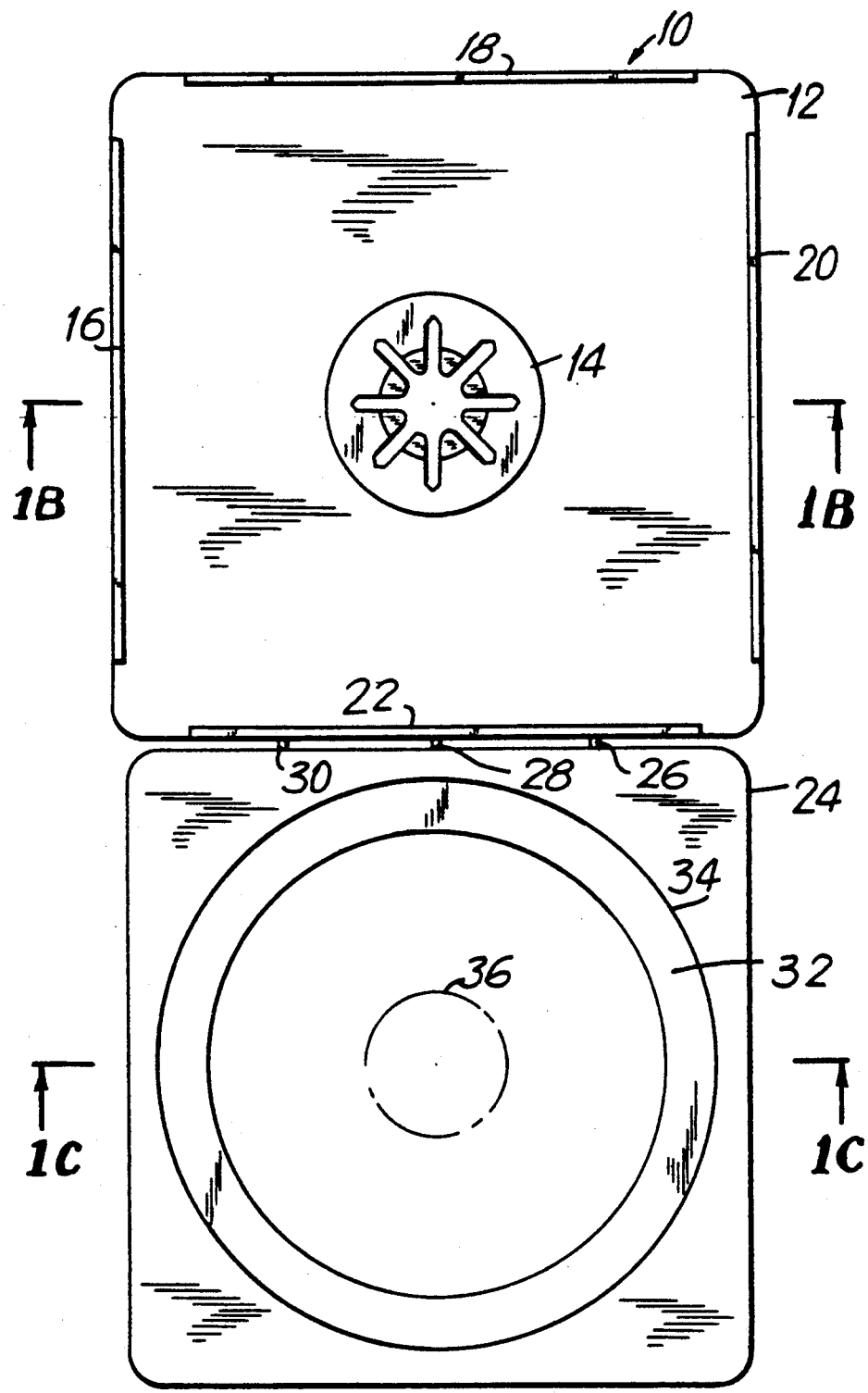
FIGS. 1A, 1B and 1C are views illustrating the adapter mechanism of the present invention.
Figure 2A:
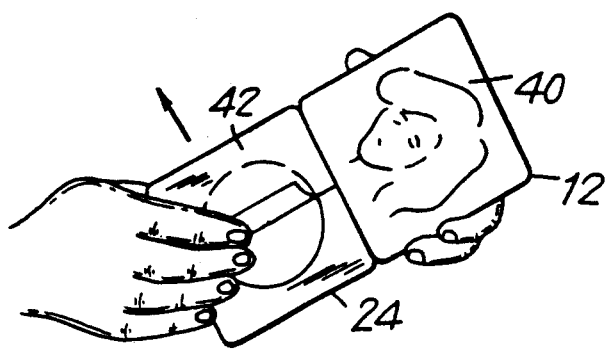
FIGS. 2A-2E illustrate a sequence of operations showing the manner in which the adaptor of the present invention is implemented.
Figure 2B:
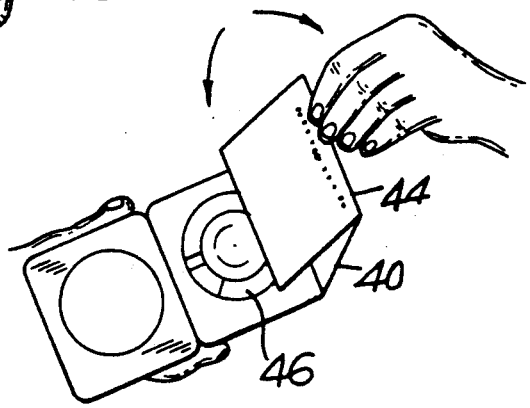
Figure 2C:
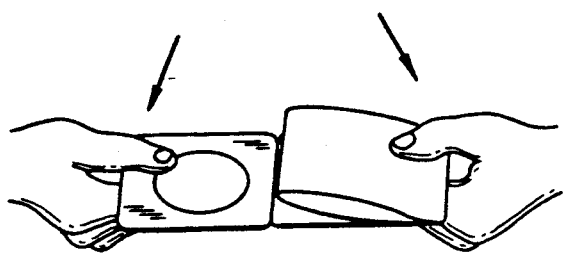
Figure 2D:
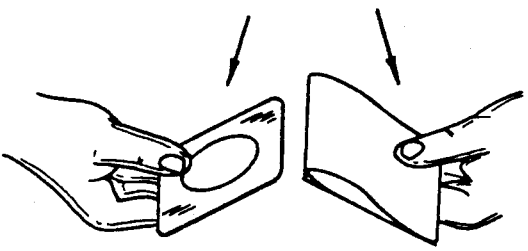
Figure 2E:
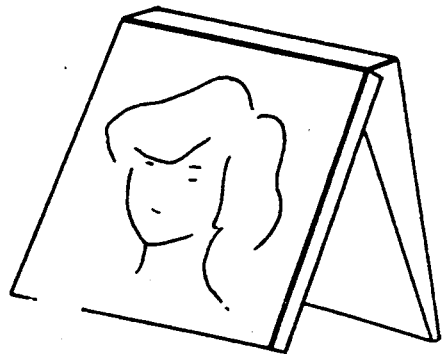
Figure 2F:
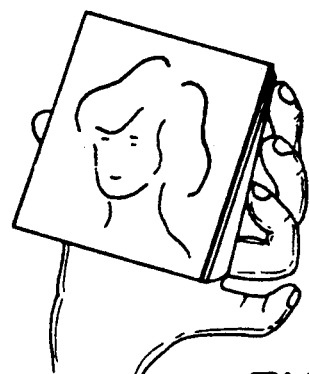
Figure 1B:
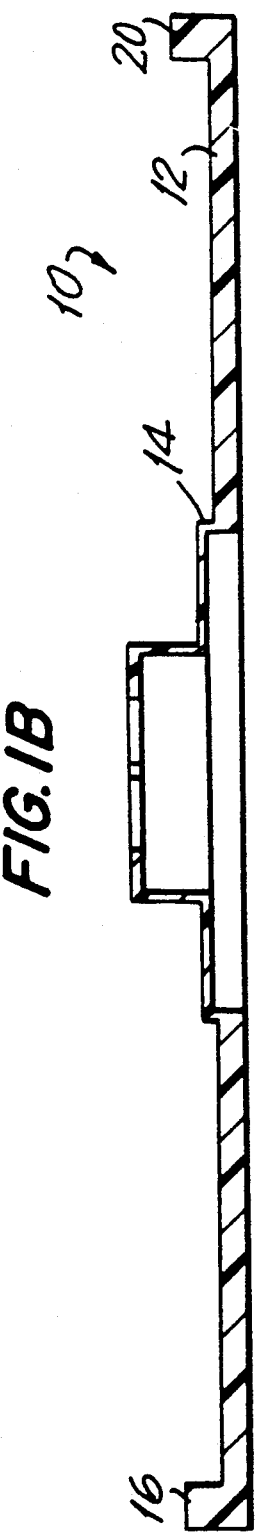
Figure 1C:
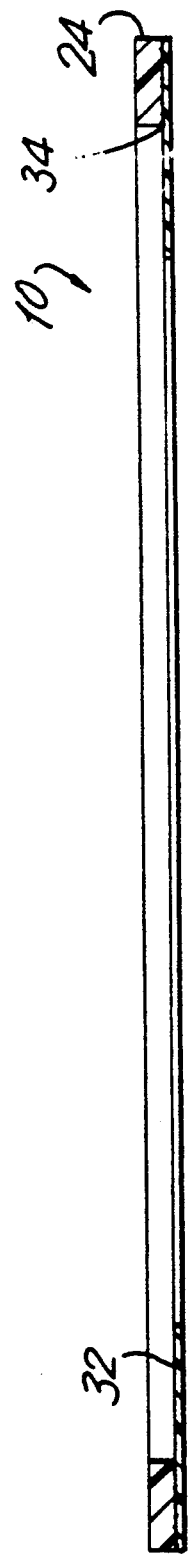

Referring to FIGS. 1A-C, there is shown an adapter mechanism 10 for use with compact disk recording media and which includes a first portion 12 which secures the disk for storage in its normal transport mode. The first portion may include a raised central segment 14 which assists in maintaining lateral security of the disk. The first portion includes frame members 16, 18, 20 and 22 at the outer periphery thereof which constitute raised areas projecting orthogonally from the surface of the first portion 12. Also shown in FIG. 1 is a second portion 24 which is detachably connected to the first portion 12 by means of a plurality of breakaway detachable hinges 26, 28, and 30. Although three hinges are shown it will be understood more or less hinges may be provided, the only constraint being the security of the connection and the ability of the operator to break the first portion 24 from the first portion 12.

The second portion includes a support surface area 32 upon which the outer periphery is defined by a mounting segment 34 which is typically about a 3/10 inch wide. The mounting segment is preferably a strip of adhesive, such as a laminated glue or the like, affixed to the support surface 32. Preferably the portion 24, in order to provide a more secure and stable support for the compact disk when placed therein. Alternatively, the adhesive layer 34 may be formed directly on a coplanar surface which constitutes the support surface 32 on the second portion 24. In such case, in order to insure lateral stability it may be preferable to include a central mounting area 36 which will secure the compact disk in position when placed on the support surface 32.

With reference now to FIG. 2, the manner in which the operation of the adapter structure of the present invention is implemented as shown in greater detail. The adapter mechanism is provided in a package which consists of the first and second portions 12 and 24 and includes descriptive or advertising material sheet 40 imprinted in a manner so as to overlay the first or upper portion 12. The second or lower portion 24 includes a cover 42 adhesively secured over the surface of the second portion 24 and secured to advertising material sheet 40. The initial operation involves peeling the cover off the lower portion while tearing it along suitable perforations to separate it from the advertising material sheet 40. Once the cover has been removed, as is shown in FIG. 2B, the advertising material sheet may be folded up and in half at a crease 44 provided for this purpose. This exposes the compact disk 46 residing in the first portion storage area. Referring to FIG. 2C, the operater then grips the lower portion with one hand and the upper portion with the other, and as shown in FIG. 2D, breaks the two segments apart in the area of the hinges, 26, 28, and 30, as are shown in FIG. 1. Once broken apart, the compact disk 46 may be removed from its storage area and placed on to the adhesive mounting segment with the recorded surface facing outward and secured onto the second portion. The folded sheet 40 may also be used to recover the upper and lower portion-. for later storage, as shown in FIGS. 2E and 2F. In its storage mode, the second portion may be fitted into the first portion. The broken segments of the hinges 26, 28, and 30 will protrude slightly from the upper portion of the upper frame of the second portion. The size, length and width of the lower portion is designed such that it is approximately the size, length and width of the upper portion between the surrounding frame members 16, 18, 20, and 22. The broken hinge portions 26, 28, and 30 will protrude slightly beyond this dimension. Thus, the lower portion 24 may be friction fit into upper portion 12 with the protrusion of the broken hinge areas 26, 28, and 30 providing additional friction fit for securing the lower portion into the upper portion.

Although shown in substantially square format, it will be understood that both first and second portions may be designed in a rectangular manner, the only criteria for storage being that the second portion will be dimensioned so that it will fit snugly and securely within the first portion for storage. The first and second portions may be made at a suitable high impact polystyrene or other forms of plastic typical for such configurations. As discussed above, the diagonal dimension of the second portion is suitable dimensioned for playing the small compact disk 46 on a player which normally accommodates a compact disk of a diameter equal to the length of a side of the second portion. It should be noted that a side with a length of approximately 3.3 inches will accomodate a circle with a diameter of approximately 3.14 inches. In the first embodiment the support surface of the second portion is preferably molded integrally with the recessed portion. The mounting segment may consist of a 10 mil Mylar piece die cut with a laminated glue forming the adhesive. It is intended that the compact disk, once placed on the adhesive, will be affixed thereto permanently. The second portion 24 will then serve as an adapter mechanism as well as the base of the first portion for storage within the first portion when the compact disk is not in use. Although the compact disk is shown as being placed upon one side of the second portion, it will be understood that the compact disk may be place on either side, an option that may be available to the manufacturer for packaging as desired. Sample dimensions are shown for purposes of illustration only.

The support surface may also be a die cut plastic formed with a ridge of approximately the diameter of the compact disk with the adhesive area being placed along the radially extending inward portion of the support surface for securing the disk in position. The recording surface will be placed in a manner such that it faces upward, as shown in FIG. 1 and the disk mechanism including the adapter placed in the disk player in a manner whereby the recording surface is exposed to the laser beam mechanism in the usual conventional format. It is also noted that although this invention is described in the context of an audio reproductive system that the invention herein may be employed in any system wherein the adaption of one size disk to a different sized player is desired. The attachment of the CD3 to the adapter may be extended beyond the use of adhesive to include any temporary or permanent mechanical attachment using friction or pressure devices molded into the adapter.

Other modifications, variations, substitutions and alterations will be apparent to those skilled in the art, it being intended that the scope of the invention will be defined by the appended claims, wherein what is claimed is:

We claim:

1. An adapter including a storage case for use with compact disk recording media for use of a small disk of a first diameter on a mechanism only capable of handling recording media of a diameter larger than said first diameter comprising:
    a first portion for securing said disk, said first portion storing said disk prior to use,
    a second portion constituting said storage case detachably connected to said first portion and having a support surface and a mounting segment on said support surface, said mounting segment being circular and of sufficient diameter to accommodate said disk in operative position on said mechanism, said support surface being substantially rectangular and having a length and width larger than said first diameter.

2. The adapter of claim 1 wherein said first portion includes a raised central area for laterally securing said disk.

3. The adapter of claim 1 wherein said mounting segment is a depressed portion integrally molded with said support surface.

4. The adapter of claim 1 wherein said mounting segment includes an adhesive area substantially surrounding the outer peripheral area thereof for accommodating said disk.

5. The adapter of claim 1 wherein said second portion includes a plurality of breakaway hinges attaching said second portion to said first portion, said hinges allowing said first portion to open away from said second portion and to be detachable from said first portion.

6. The adapter of claim 1 wherein said support surface is square.

7. An adapter including a storage case for adapting a disk on a transport mechanism for transporting and mounting a compact disk, comprising:
    a first portion for storing said disk
    a second portion constituting said storage case for securing said disk, said second portion having a diameter larger than an outer diameter of said disk, said second portion including detachable mounting means and being detachably mounted from said first portion,
    said first portion including a mounting frame surrounding an outer peripheral area thereof and accommodating said disk in operative position on said mechanism, said second portion having a length and width for fitting within said first portion mounting frame.

8. The adapter mechanism of claim 5 when said second portion diameter is the same diameter of a standard disk, whereby said compact disk can be played within said second portion on a player adapted to play standard disks.

9. The adapter mechanism of claim 6 wherein said detachable mounting means provides a plurality of protrusion from said first portion, said protrusions providing a friction fit for said first portion mounting frame.

10. An adapter including a storage case for use with a compact disk recording media for enabling use of a first disk of a given diameter on a mechanism adapted to handle only disk having a second diameter larger than said given diameter, said adapter comprising:
  first and second planar portions;
  said second planar portion constituting said storage case having a central recess extending into one side thereof, said central recess being shaped to receive and centrally hold a compact disk of said given diameter at a fixed position therein;
  said first planar portion including frangible means for holding said second portion thereagainst, with the side of said second planar portion opposite said one side abutting said first planar portion, and means for releasably holding said second planar portion with said one side thereof abutting said first planar portion and for accommodating said disk in operative position on said mechanism;
  said second portion having at least one cross dimension equal to said second diameter, with no cross dimension thereof being greater than said second diameter.

11. The adapter of claim 9 wherein said first portion includes a raised central area for laterally securing said disk.

12. The adapter of claim 9 wherein said mounting segment is a depressed portion integrally molded with said support surface.

13. The adapter of claim 9 wherein said mounting segment includes an adhesive area substantially surrounding the outer peripheral area thereof for accommodating said disk.

* * * * *